United States Patent [19]

Kenrick et al.

[11] 3,805,881

[45] *Apr. 23, 1974

[54] FLUID HEAT EXCHANGE SYSTEM

[75] Inventors: Earl L. Kenrick; Harry W. Sandbert, both of Wilmington, Del.

[73] Assignee: E.I. du Pont de Nemours and Company, Wilmington, Del.

[ * ] Notice: The portion of the term of this patent subsequent to May 16, 1989, has been disclaimed.

[22] Filed: Sept. 8, 1972

[21] Appl. No.: 287,347

Related U.S. Application Data

[63] Continuation-in-part of Ser. No. 172,435, Aug. 17, 1971, which is a continuation-in-part of Ser. No. 40,584, May 26, 1970, Pat. No. 3,662,817.

[52] U.S. Cl. .................................. 165/1, 165/145

[51] Int. Cl. .............................................. F28c 7/06

[58] Field of Search ............... 165/1, 158, 74, 75, 5

[56] References Cited
UNITED STATES PATENTS

| | | | |
|---|---|---|---|
| 3,662,817 | 5/1972 | Kendrick | 165/1 |
| 3,419,069 | 12/1968 | Baker et al. | 165/158 |

*Primary Examiner*—Manuel A. Antonakas
*Assistant Examiner*—Theophil W. Streule, Jr.

[57] ABSTRACT

Disclosed herein is a heat exchange system, for use in heating or cooling gases, comprising a channel and at least one bundle composed of a plurality of tubular elements made from an organic polymer composition, disposed serially within the channel.

4 Claims, 5 Drawing Figures

FLUID HEAT EXCHANGE SYSTEM

CROSS REFERENCE TO RELATED APPLICATIONS

This application is a continuation-in-part of U.S. Pat. application No. 172,435 filed Aug. 17, 1971 which in turn is a continuation-in-part of U.S. Pat. application No. 40,584 filed on May 26, 1970 now U.S. Pat. No. 3,662,817 granted May 16, 1972.

BACKGROUND OF THE INVENTION

This invention relates to an apparatus and method for heat exchange between a flowing fluid and a second fluid having a temperature significantly different than that of the flowing fluid. More specifically, it relates to an apparatus and process for heating or cooling large volumes of corrosive gases, fumes, mists or vapors under process stream conditions. More specifically still, it relates to a new and improved heat exchange apparatus and process for heating or cooling gases containing sulfur dioxide.

There are a number of situations where it is desirable to cool or heat a gas with a liquid, or possibly another gas, when either the gas or the liquid is corosive. One example of such a situation is the stack gases emitted from fossil fuel burning power plants. These gases are normally loaded, not only with particulate pollutants, but also with sulphur dioxide. The particulate pollutants can be removed by fiber filters, but only when the gas temperature has been reduced to a level where it will not destroy the filters, so some method of cooling and reheating the hot corrosive gases before they contact the filters is necessary. Another example is in the drying of chlorine gas. Cooling the corrosive gas will lead to condensation of the moisture contained in the gas, but the cooling means must be able to withstand the corrosive nature of the gas. The same type of system is useful in solvent recovery. An example of the situation in which a corrosive liquid might be used to heat a gas would be a fuel cell utilizing a corrosive liquid as the heating medium. Air blown over coils containing the hot corrosive medium is then used to transfer the heat to the desired area.

It is an object of this invention to provide an improved heat exchanger for use with flowing gas, particularly hot corrosive gases, which can be integrated into portions of the existing systems. It is a further object of this invention to provide an improved heat exchanger for use in cooling or reheating hot corrosive gases under process conditions, using a sealed system, so that pollution problems are reduced. It is a still further object of the present invention to provide a simple heat exchanger system, for use in cooling or reheating hot corrosive gases, in which sections of the entire system can be replaced or repaired on the plant site without necessitating plant shut down.

SUMMARY OF THE INVENTION

These and other objects are accomplished by providing: an elongated tank, channel or duct for receiving the stream of corrosive gas; one or more heat exchanger bundles, each comprising a plurality of tubular elements made from an organic polymer composition, located within the tank, channel or duct; bundle securing means connected to the bundles and adapted to hold the bundles in a position within the channel and conduit means connected to each bundle to supply one end of each bundle with a fluid normally a liquid, having a temperature significantly different from that of the stream of corrosive gas and to receive the fluid from the other end of the bundle. The channel, which s normally a sealed channel, has an inlet means and an outlet means located at opposite ends to accommodate flow of the stream of corrosive gas therethrough and each bundle is disposed within the channel across substantially the entire flow path of the stream of corrosive gas. In this way, a temperature gradient is maintained between the corrosive gas at the inlet and outlet ends of the channel. For convenience in the discussion that follows, the apparatus and process will be described in terms of an apparatus and process for cooling a hot corrosive gas with a cooling liquid, but the apparatus and process are equally suitable for cooling a hot corrosive gas with a cold gas or heating a cold corrosive gas with a hot liquid or gas, such as steam.

In one embodiment, the bundles are U-shaped bundles positioned in the tank so that the corrosive gas either flows through both legs of the U simultaneously, or through each leg in sequence. The U-shaped bundles comprise a plurality of tubular elements made from a fluorocarbon polymer composition and a plurality of spacer plates. These spacer plates are made from an organic polymeric material, preferably a fluorocarbon, and they coact with each of the tubular elements by providing regularly spaced openings through which the tubular elements pass. The spacer plates are not attached to the walls of the channel, but are designed to fit snugly within the tank so that the matrix of tubular elements extends to the walls of the channel. Anchoring means can also be provided to prevent the portion of the bundles disposed near the bottom of the tank from being forced away from the bottom of the tank by the force exerted on them by the gas flowing through the tank. In a second embodiment, the bundles are in the form of rectangular arrays, extending from one side of the tank to the other, and the spacer plates, as described above, act to maintain the tubes in substantially equally spaced apart relationship.

In the preferred embodiment, the anchoring means simply comprises metal rods passing through holes in the spacer plates. When used with the U-shaped configuration, these metal rods are also curved into the shape of a U. In one embodiment, the curved U-shaped rods provide enough weight and structure to the tube bundle so that they alone, or in combination with a hanging baffle plate, are enough to insure that the tube bundle does not swing away from the bottom of the tank under the force of the gas flowing through the channel. In another embodiment, the U-shaped anchoring means are supplemented by a stiff metal rod, also passing through the spacer plates, which extends to the bottom of the tank and coacts with a stop located at the bottom of the tank.

When used with a flat matrix array, which is designed to fit vertically into the channel, the anchoring means can be straight metal rods coacting with the spacer plates by passing through them to provide sufficient structure to the tube bundle to prevent it from being forced away from the side walls of the channel.

Anchoring to the top and bottom of the tank is provided by a support means that is attached to the inlet and outlet headers at the terminal portions of the tube bundle. If the flat matrix array is supported horizontally within the tank, by support means on the sides of the tank, rather than at the top and bottom, additional rods passing from one side of the tank to the other and coacting with the rods passing through the spacer plates may be used to give additional support against sagging of the tube bundle and the consequent separation of the tube bundles from the sides of the tank. Alternatively, the anchoring means can be L-shaped channels attached to the sides of the channel and supporting but not connected to the spacer plate.

The metal rods or L-shaped channel can be made from any relatively impervious metal, preferably lead, stainless steel or iron. To protect the metal they can be encased in a sheath made from some impervious material such as a fluorocarbon resin. Since the rods and channels are metal and the tubular elements are plastic, they have different coefficient of thermal expansion. The plastic expands and contracts much more than the metal. Therefore, the tube bundles must be independent of the support structure and the wall of the tank, so the tubular elements are free to undergo their own expansion and contraction without being constrained to a fixed tube bundle length imposed by any connection between the bundles and support structure.

BRIEF DESCRIPTION OF THE DRAWINGS

The operation and advantages of the present invention can best be seen by reference to the following figures; wherein.

DESCRIPTION OF SEVERAL EMBODIMENTS

Figure 1:
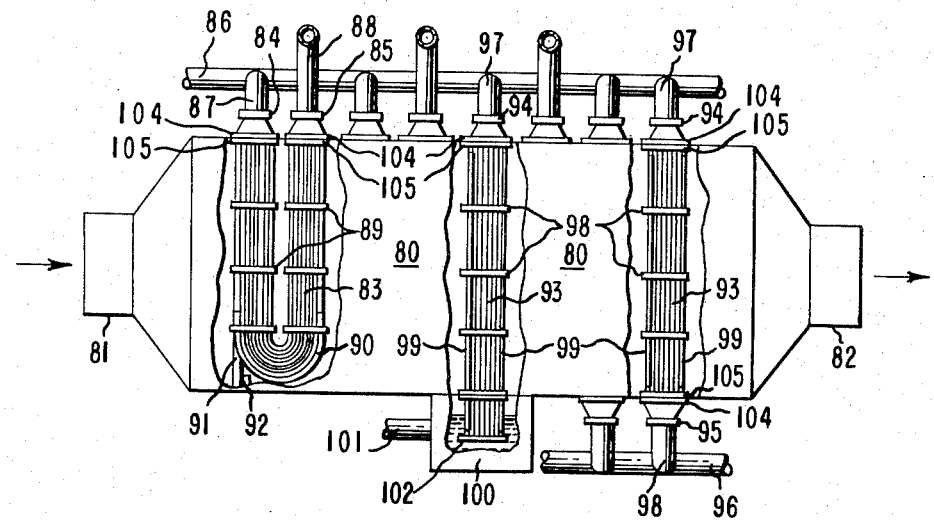
FIG. 1 is a cut-away side view of one embodiment of the present invention showing three types of coil connections.

FIG. 1 illustrates one embodiment of the present invention in which the channel is in the form of a sealed duct 80 through which a gas flows from inlet 81 to outlet 82. The channel can be made from any suitable material such as stainless steel, aluminum, brick, fiberglass reinforced plastic, or carbon steel with a plastic liner. Three possible tube bundle configurations are shown. The first of these is a U-shaped tube bundle 83 with inlet and outlet means, 84 and 85 respectively, connected to an inlet header 86 and an outlet header, not shown, by pipes 87 and 88. A cooling liquid, usually water, is supplied to each tube bundle through pipe 87. The tube bundles are sealed into the tank by headers 104 and 105. The individual tubes are positioned by spacer plates 89; the entire tube bundle is structured by plastic coated metal rod 90; and the bundle is restrained from moving under the force of the flowing gas by plastic coated metal rod 91 which engages stop 92 and the bottom of the tank.

Figure 2:
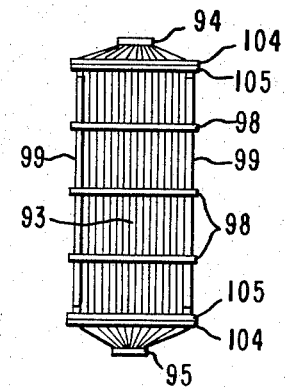
FIG. 2 is a front view of one embodiment of a tube bundle useful in the present invention.

The right hand tube bundle configuration is a rectangular array 93 which has inlet and outlet means 94 and 95, respectively, connected to inlet header 86 and outlet header 96 by pipes 97 and 98. The individual tubes are spaced by spacer plates 98 and rigidity is provided by plastic coated metal rods 99. The rectangular array, a front view of which is shown in FIG. 2, extends from the top to the bottom of the duct.

The middle tube bundle configuration is similar to the second in all respects except the outlet means. In this configuration, the tubes are not gathered into an outlet header. The outlet ends of the tubes are loose ends that are inserted into a sump 100. The cooling liquid fills the sump, covering the ends of the tubes, and exists through pipe 101. The liquid in the sump provides a liquid seal against the leakage of gas flowing through the duct.

Although the bundles are shown running from the top to the bottom of the tank, they may be angled to increase surface area, so long as some baffling arrangement is provided to prevent bypass of the gas flowing through the duct.

Figure 3:
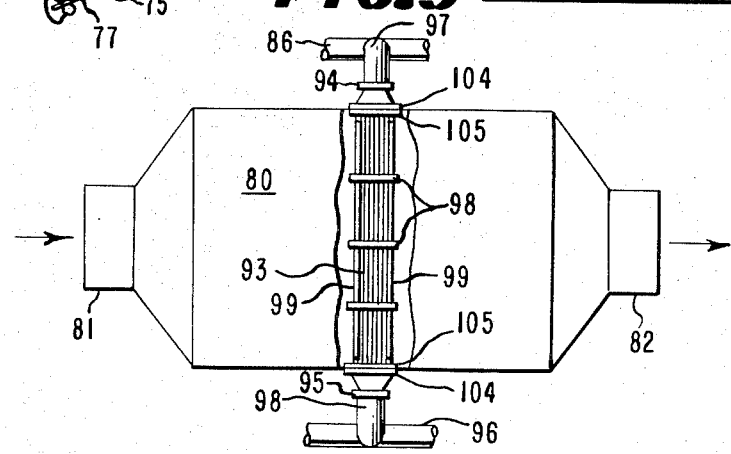
FIG. 3 is a cut-away side view of a second embodiment of the present invention.

FIG. 3 illustrates a second embodiment of the present invention in which a single tube bundle is used. Again the channel is in the form of a sealed duct 80 through which a gas flows from inlet 81 to outlet 82. The tube bundle is a rectangular array 93 which has inlet and outlet means 94 and 95 respectively connected to inlet header 86 and outlet header 96 by pipes 97 and 98. The tubes are spaced by spacer plates 98 and rigidity is provided by plastic coated metal rods 99. The tube bundles are sealed into the tank by header 104 and 105. The bundles are composed of a plurality of small relatively flexible tubular elements made from an organic polymer composition, preferably a fluorocarbon such as "Teflon" (Registered trademark of the E. I. du Pont de Nemours & Co.) fluorocarbon resin. Because of the low heat conductivity of organic material relative to metal, a large number of small diameter tubes are necessary to achieve the desired heat exchange. Normally, each bundle contains between 500 to 4,000 individual tubular elements each having an outside diameter ranging from about 5 to about 275 mils, preferably 100 to 250 mils, and a wall thickness ranging from about 0.5 to about 30 mils. The tubular elements are disposed in the tank across the entire flow path of the hot flowing gas, extending from one wall of the narrow channel to the other and from the top of the channel to the bottom.

Figure 4:
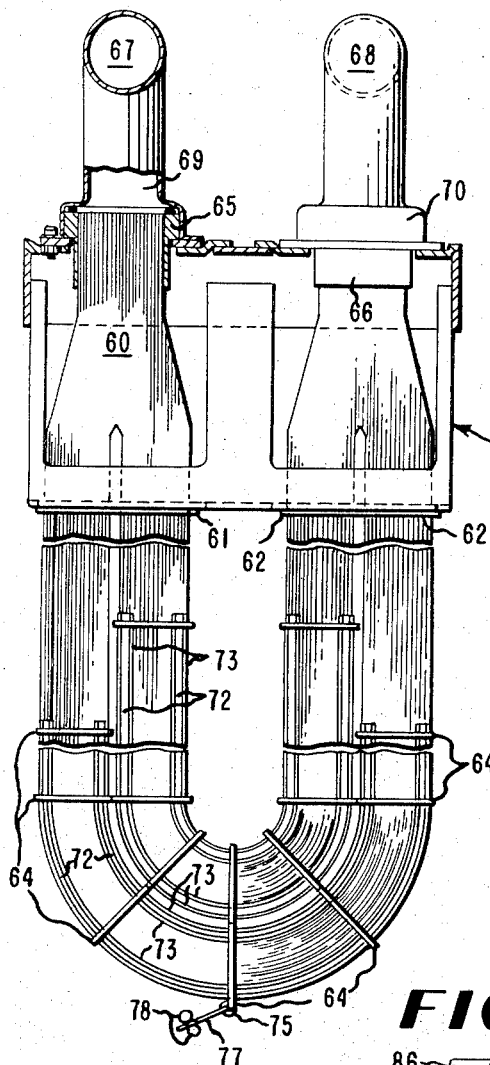
FIG. 4 is a side view of one embodiment of a tube bundle useful in the present invention.
Figure 5:
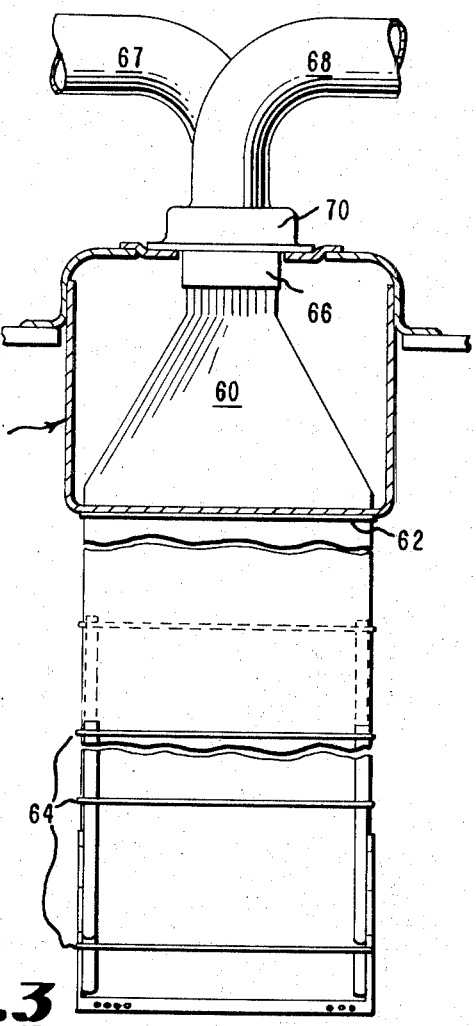
FIG. 5 is a front view of the embodiment of the tube bundle shown in FIG. 4.

One particularly useful tube bundle design is illustrated in FIGS 4 and 5 which are side and front views of the same bundle respectively. In this embodiment, a plurality of tubular elements, 60, are gathered into a single U-shaped tube bundle which, for convenience of construction, is divided into two or more sections, depending upon how many tubular elements are involved. In this embodiment, the individual tubes 60 are threaded through rigid spacer plates 61 and 62 which are made from a metal, a plastic, or any suitably rigid composition. Only two rigid members are needed to set the alignment of the tubes, since once the alignment of the individual tubular elements is set at the ends of the bundle, is maintained throughout the tube bundle without additional aid. Non-rigid spacer plates 64 made from a noncorrodable material such as Teflon may be used with corrosive fluids. Their primary purpose is to aid in maintaining the spacing, but they also serve to keep the individual tubular elements from rubbing directly against the walls of the tank and from separating from the tank. Each tubular element in the tube bundle, then, is threaded through the two rigid spacer plates 61 and 62 and a plurality of flexible spacer plates 64 to form the U-shaped configuration illustrated. The ends of the individual tubes are then gathered together and contained in sleeves 65 and 66 which form the inlet and outlet means of the tube bundles and are connected to the cooling liquid headers 67 and 68 by flanges 69 and 70. There are a number of ways in which the end structure can be constructed. One particularly useful way is described in U.S. Pat. No. 3,315,740 for a Flexible Plastic Tube Bundle and Method of Making issued on Apr. 25, 1967 to M. S. Withers. This patent describes a way to honeycomb the individual tubular elements together and to bond them to one another and to the walls of the tube sleeve so that an end structure having no leaks is formed. While this method is useful and convenient, any well known manner, such as molding or potting in resin, for forming an end structure for the tube bundle can be used. The bundle is then connected to a supporting structure 71 used to support the bundle in the cooling tank.

Some means should be provided to anchor the bundles so that they do not sway up, from the bottom of the tank and provide a bypass path for the gas beneath the bundle. This is not as important when the fluid to be heated or cooled is a gas as it is when the fluid is a liquid, but it is helpful in both cases. Some means to physically attach the bottom of the tube bundles to the bottom of the cooling tank could be used, but this would make removal of the tube bundle difficult. In the embodiment illustrated in FIG. 4, the anchoring means is provided by a series of U-shaped metal rods 72 which are first encased within a Teflon tube 73 and then strung through the spacer plates 64 along with the individual tubular elements. These rods which can be made from any metal such as lead or steel are used to secure the bundles so they are forced to the bottom of the tank and as such they provide an anchoring means which leaves the individual tube bundles free to be removed from the tank at will.

To further aid in preventing bypass of the fluid under the tube bundle, a sheet of Teflon, 75, is attached to the bottom spacer plate 64 by Teflon lacing 77. The sheet 75 can be weighted with Teflon coated metal rods 78 or rest against a stop and is intended to act as a baffle. If the tube bundle moves upward, the sheet swings downward to prevent hot fluid from bypassing the tube bundle by flowing under it. Side baffles to further prevent bypass of fluid are also beneficial. These can be either rigid or movably attached to the sides of the channel or to the tube bundles. In one embodiment, these side baffles can be sheets of Teflon or other fluoropolymer materials, laced to the tube bundles, with Viton tubing attached to the edge of the sheet adjacent to the walls of the channel to provide a substantially leak tight compression seal between the baffle and the walls of the channel. In another embodiment, the baffles are Teflon sheets in the shape of a chevron or a semi-circle oriented in the process stream so that the side baffles will expand into contact with the wall under the pressure exerted on them by the process stream to provide a tight fitting seal. A pair of baffles rigidly attached to the side walls of the channel can also be used to immobilize the bundles in the channel.

The embodiments illustrated are particularly useful in process stream applications where each individual tube bundle can be removed from the tank for repair without shutting down the plant. If one or more tubular elements develop a leak, they can be plugged on site and placed back into operation immediately. It is to be understood, however, that a number of other configurations both in the construction of the cooling tank and in the construction of the tube bundles is possible. The above discussion is for the purpose of illustrating the usefulness of the present invention and is not meant to limit the scope of the invention set forth in the following claims.

What is claimed is:

1. A process for accomplishing heat exchange between a stream of corrosive gas and a fluid comprising the steps of:
    a. introducing said stream of corrosive gas into the inlet end of a sealed channel;
    b. providing at least one heat exchange bundle comprising a plurality of substantially equally spaced tubular elements made from an organic polymer composition disposed across and substantially perpendicular to the entire flow path of said stream of corrosive gas through said channel;
    c. supplying each tubular element in each heat exchange bundle with a fluid having a temperature significantly different than that of said stream of corrosive gas;
    d. allowing said stream of corrosive gas to flow through said channel in a manner such that substantially all of said stream of corrosive gas passes perpendicularly between and in intimate contact with the tubular elements in each of said heat exchange bundles in seriatum, whereby a temperature gradient is maintained between said stream of corrosive gas at the inlet and outlet end of said channel; and
    e. allowing said stream of corrosive gas to exit from the outlet end of said channel.

2. The process of claim 1 wherein said stream of corrosive gas is a stream of hot gas and said fluid is a cooling liquid supplied in parallel to each heat exchange bundle.

3. The process of claim 1 wherein said stream of corrosive gas is a stream of cold gas and said fluid is a heating liquid supplied in parallel to each heat exchange bundle.

4. The process of claim 1 wherein a plurality of heat exchange bundles are provided.

* * * * *